Figure 1:
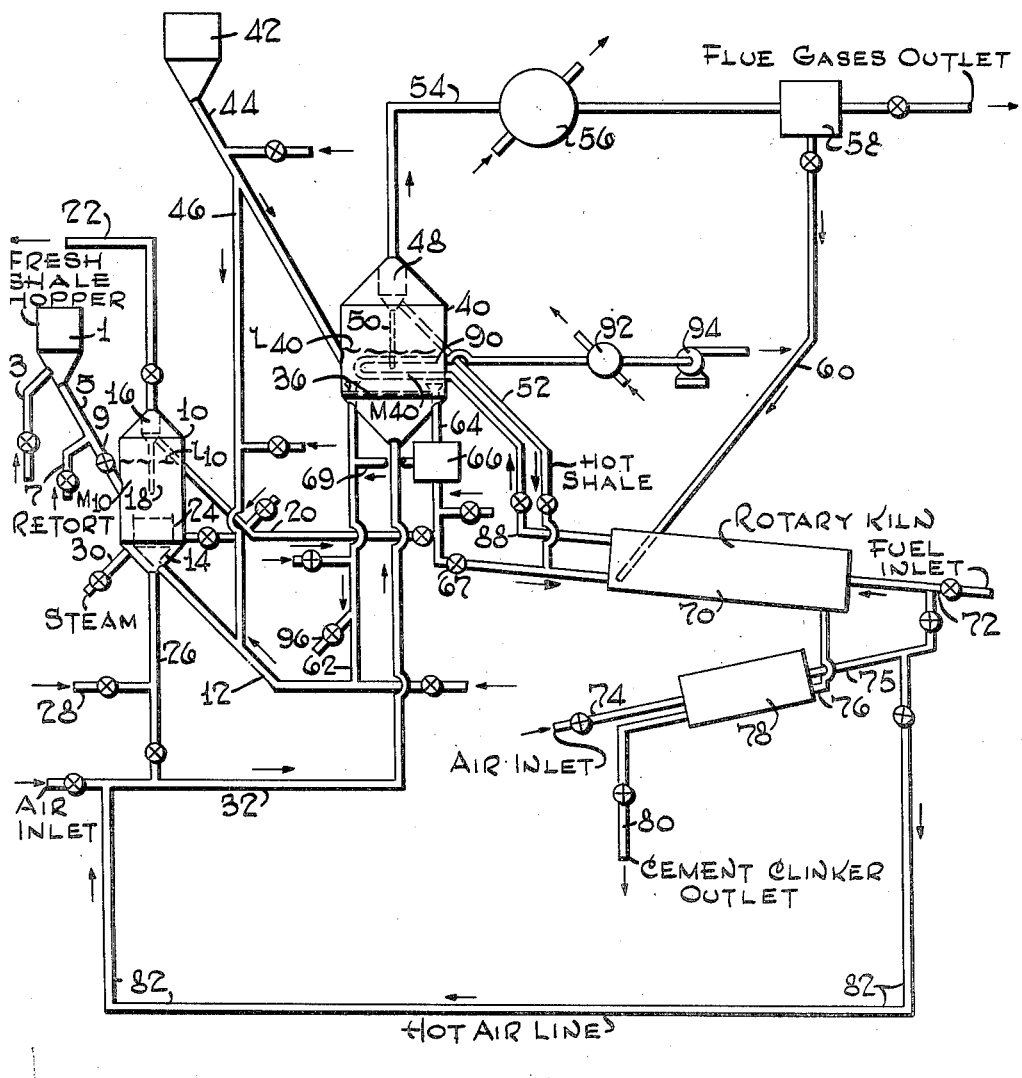

April 8, 1952 W. A. REX ET AL 2,592,468
MANUFACTURE OF CEMENT
Filed Dec. 6, 1947 2 SHEETS—SHEET 1

Walter A. Rex
Chester L. Read Inventors
By L. F. Marx Attorney

Patented Apr. 8, 1952

2,592,468

UNITED STATES PATENT OFFICE 2,592,468

MANUFACTURE OF CEMENT

Walter A. Rex and Chester L. Read, Westfield, N. J., assignors to Standard Oil Development Company, a corporation of Delaware Application December 6, 1947, Serial No. 790,076

13 Claims. (Cl. 106—100)

The present invention relates to the art of manufacturing cement. More particularly, the invention is concerned with a novel process for manufacturing cement from the solid residues of the distillation of oil-bearing minerals such as oil shales, which contain silica, alumina and iron in proportions adequate to yield a high quality Portland-type cement when combined with suitable amounts of lime.

The production of oil from oil-bearing minerals, such as oil shales, has assumed increasing importance in recent years as a result of the steady decline of known petroleum resources. The economics of oil shale distillation are greatly affected by the low value of the solid distillation residue which may amount to more than 70% of the fresh shale, particularly in the relatively lean varieties prevailing in this country. The economical utilization of the spent shale is, therefore, a problem of major importance in the shale distilling industry. The present invention solves this problem by providing a process for converting spent shale residues into a highly valuable Portland cement.

It is well known in the art that Portland cement is produced by sintering mixtures of finely ground minerals containing lime, silica, alumina, and iron oxides in definite proportions at temperatures of about 2550°–2750° F. and fine-grinding the clinker so obtained. The quality of the cement is chiefly a function of the proportions of its essential constituents, that is, lime, silica, alumina and iron oxide and of the homogeneity of the clinker which depends largely on the degree of fineness of the materials subjected to sintering. A high grade Portland cement may be obtained from mineral mixtures containing about 76–78% of $CaCO_3$, and having a ratio of per cent CAO to the sum of per cent $SiO_2$ + per cent $Al_2O_3$ + per cent $Fe_2O_3$ of about 2–2.3 and a ratio of per cent $SiO_2$ to the sum of per cent $Al_2O_3$ + per cent $Fe_2O_3$ of about 1.8–3.5. The minerals prior to sintering should have a particle size of about 90% through 100 mesh, or about 20–150 microns. The sintering is carried out in shaft or rotating kilns fired internally by the combustion of solid, liquid or gaseous fuels with an average fuel consumption of carbonaceous material of about 15–18% for shaft kilns and 25–30% for rotating kilns, based on the weight of the clinker produced.

It has now been found that certain oil-bearing minerals, particularly various lean oil shales, such as Colorado-type shales, may be subjected to distillation in such a manner as to yield a spent residue which, as the result of its suitable composition and fineness, may be directly mixed with suitable proportions of ground limestone and then burned to yield a high grade cement clinker.

In accordance with the present invention, oil-bearing minerals the ash of which is relatively rich in alumina and iron oxide, such as Colorado-type oil shales, are subjected to distillation employing the so-called fluid solids technique wherein the starting material is distilled in the form of a dense turbulent mass of subdivided solids fluidized by an upwardly flowing gas to resemble a boiling liquid having a well defined upper level. The spent residue produced in this process has been found to contain large proportions of particles of extremely small size which, without further grinding, may be mixed with ground limestone to produce a suitable charge for cement kilns. The particle size of these fines is practically independent of the particle size of the shale charged to the retort provided the fresh shale has a particle size within fluidizable ranges of, say, up to about ¾ in. diameter, because shale particles of all sizes disintegrate rapidly to a fine powder in fluid operation. The fine spent shale particles also normally contain about 10–15% by weight of combustible non-volatile carbonaceous constituents which may afford fuel savings in the cement sintering stage of about 15–25%.

Spent shale particles having a particle size not substantially greater than about 100 microns may then be mixed with the necessary amount of properly ground limestone and charged to a conventional type rotary kiln for burning and sintering. The spent shale fines are preferably charged to the kiln substantially at the temperatures at which they are recovered from the distillation whereby the sensible heat of the spent shale may be utilized for the burning and sintering process.

The distillation of the oil-bearing minerals may be carried out in any known manner involving the maintenance of the mineral in the distillation retort in the form of a dense, turbulent, fluidized mass of subdivided solids. Distillation temperatures of about 700°–1200° F., preferably about 800°–1100° F., may be employed at pressures of about 1–10 atm. abs. The particle size of the fresh charge may vary between about 100 mesh and ¾ in. diameter but is preferably kept at about 50 mesh to ¼ in. size. Superficial gas velocities of about 0.5–5 ft. per second, preferably about 1–3 ft. per second, are suitable for proper fluidization at the particle sizes indicated. The heat required for distillation may either be generated within the distillation retort by partial combustion of combustible shale constituents or supplied as sensible heat of spent shale highly heated by combustion of coke on the spent shale in a separate, preferably fluid-type, heater or by a preferably indirect heat exchange with hot flue gases from the cement kiln or by a combination of these methods, all in a manner known per se.

The spent fines to be used for cement manufacture in accordance with the invention may be recovered either from the distillation retort or from the separate heater or from both vessels. However, care should be taken to prevent spent shale particles larger than about 150 microns size to enter the charge for the cement kiln. This may be accomplished in various ways.

For example, the distillation retort and/or the separate heater, if used, may be provided with suitable packings, grids, perforated plates, etc. which, in combination with proper superficial gas velocities, make it possible to carry the desired fines overhead suspended in the volatile distillation products or flue gases while retaining the fluidized coarser material in the vessels. The fines may also be withdrawn from these vessels together with coarser spent particles and a suitable separation may be carried out outside the vessels by suitable known means, such as elutriation, sieving, fractionating, centrifugal separation, etc. When a separate heater is used, this extraneous separation of coarse from fine particles may be applied either to the solids flowing from the retort to the heater or to those flowing from the heater to the retort or to both solids streams so as to keep the coarse material in circulation between these vessels and to withdraw the fines to the cement kiln.

The limestone may be mixed with the spent fines in a separate mixer. However, in accordance with preferred embodiments of the invention the finely ground limestone is added at least in part to the retort and/or the separate heater. The fluid operation of these vessels permits a perfect mixing of the cement components. Simultaneously, the mixing zone may take the place of the "first two stages" of a rotary cement kiln, which are usually operated at temperatures of about 1000°–1800° F. This may be accomplished without affecting optimum retorting conditions whenever a separate heater is used which may be readily operated at the desired "first" and/or "second stage" temperature. This type of operation affords the further advantage of reduced solids-circulation requirements between retort and heater because of the greater temperature differential between these two vessels.

The rotary cement kiln may be operated in any conventional manner which requires no detailed explanation for a full understanding of the present invention.

Figure 2:
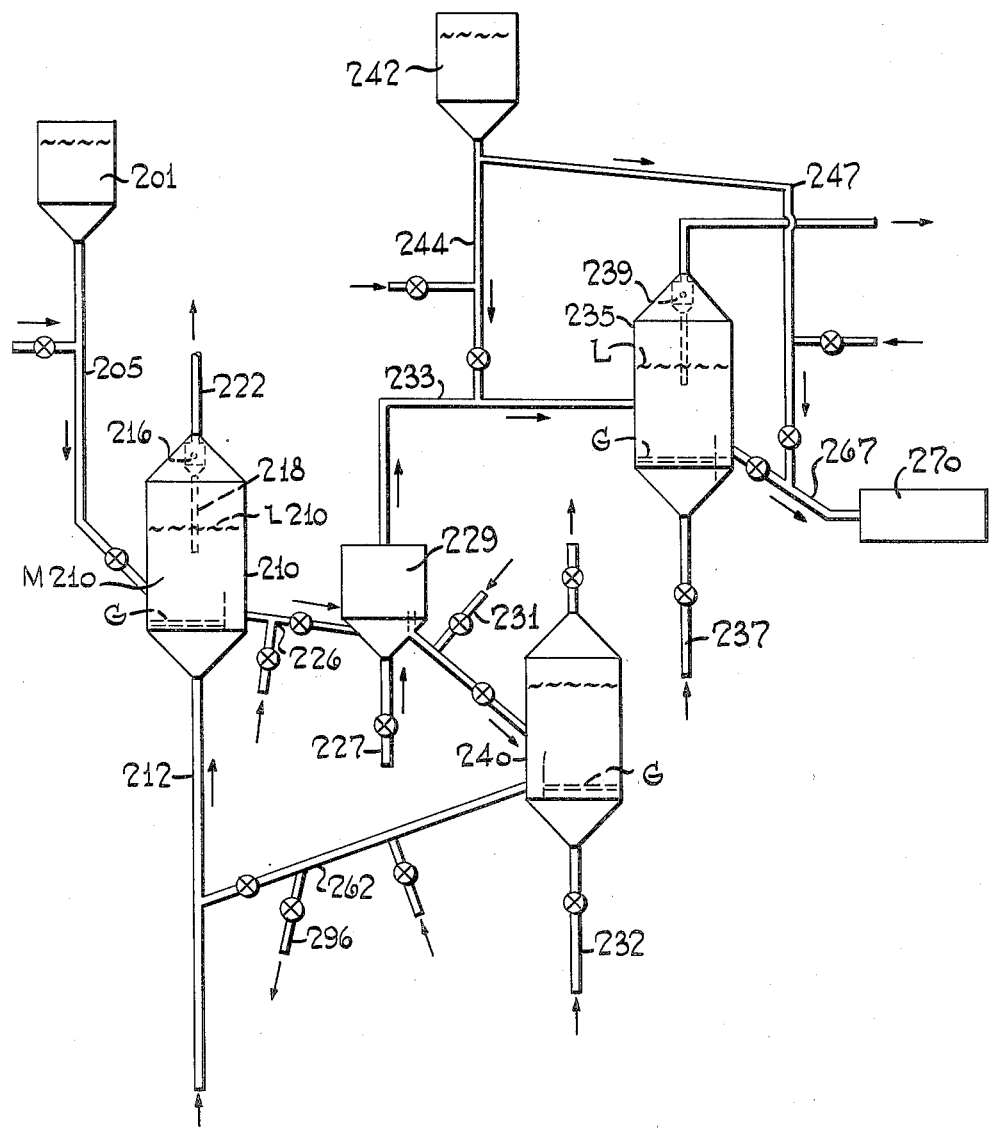

Having set forth its objects and general nature, the invention will be best understood from the more specific description hereinafter wherein reference will be made to the accompanying drawing wherein Figure 1 is a partly diagrammatical illustration of a system suitable for carrying out a preferred embodiment of the invention; and Figure 2 is a similar illustration of another system suitable for separating spent fines from coarse distillation residue.

Referring now to Figure 1, the system illustrated therein essentially comprises a distillation retort 10, a separate heater 40 and a rotary cement kiln 70, the functions and cooperation of which will be forthwith explained using the treatment of Colorado oil shale as an example. It should be understood, however, that other similar oil-bearing minerals may be treated in a generally analogous manner.

In operation, shale feed hopper 1 may contain Colorado shale crushed to a particle size of about 3-8 mesh. The shale may contain about 20-40% volatile constituents and about 60-80% of ash, the latter having a composition about as follows:

|  | Wt. % on fresh shale |
|---|---|
| $SiO_2$ | 30–35 |
| $Al_2O_3$ | 10–14 |
| CaO | 5–7 |
| MgO | 2–4 |
| $Fe_2O_3$ | 2–4 |
| $Na_2O$ | 2–5 |
| $SO_3$ | 2–4 |

The shale may be dried and preheated in heat exchange with hot product or flue gases to a temperature of about 350°–500° F., by any conventional means. The preheating gases may be supplied through line 3 to serve simultaneously as aerating gases maintaining the shale feed in a readily flowing, quasi-fluid state. Fresh shale flows from hopper 1 downwardly to retort 10 through a conventional standpipe 5 aerated through one or more taps 7 with small amounts of steam or flue gas to facilitate the solids flow which may be controlled by valve 9. Simultaneously, a gas is supplied through line 12 to a conical distributing device 14 arranged in the bottom portion of retort 10. The superficial vapor velocity in retort 10 is controlled at about 0.5–4 ft. per second so as to convert the shale therein into a dense turbulent mass of solids $M_{10}$ having a well defined upper level $L_{10}$.

The temperature within retort 10 is maintained preferably at about 800°–1000° F. This may be accomplished either by sufficiently preheating the process solids and gases or by conducting a limited combustion of combustible shale constituents within mass $M_{10}$ or by supplying suitable proportions of hot spent shale from heater 40 as will appear more clearly hereinafter, or by any suitable combination of these means. For example, temperatures of the range specified may be maintained by preheating the shale to about 400° F. and supplying about 2.0 to 6.0 mols of oxygen in the form of air through line 12 or recycling about 7 tons of spent shale having a temperature of about 1100°–1200° F. from heater 40, per ton of shale to be treated. The pressure within retort 10 is preferably maintained at about 3–30 lbs. per sq. in. gauge.

At the conditions specified, the shale undergoes rapid distillation and disintegration. After, say, about one-half of its total residence time in mass $M_{10}$, the shale particles may have disintegrated to an average particle size of less than 100 microns, and after further treatment some 30–70% of the shale is present in the form of fines which are carried overhead from level $L_{10}$ suspended in the volatile distillation products. These fines may have a particle size distribution about as follows:

|  | Per cent |
|---|---|
| 0–10 microns | 30–40 |
| 10–20 microns | 30–40 |
| 20–40 microns | 10–15 |
| 40+ microns | 5–10 |

At the prevailing gas velocities, a substantially complete separation of these fines from coarser material may be accomplished in retort 10, the fines being carried overhead as gas entrainment and the larger particles remaining within mass $M_{10}$. This effect may be aided, if desired, by packing, porous plates, or the like, arranged within mass $M_{10}$ in a manner known per se.

Volatile distillation products and entrained spent shale fines are withdrawn from $L_{10}$ and passed to a gas-solids separation system 16 which may comprise conventional centrifugal and/or electric precipitators and which may be so operated as to fractionate the separated fines into a relatively coarse fraction which may be returned to retort 10 through line 18 and a relatively fine fraction of less than about 100 microns average size which may be withdrawn through line 20 to be further treated as will appear hereinafter. Volatile products, now substantially free of entrained solids, are withdrawn through line 22 and passed to a conventional product recovery system (not shown).

Relatively coarse spent shale having an average particle size above about 100 microns settles in the annular space 24 around cone 14 from which it is withdrawn through a standpipe 26 aerated through one or more taps 28. If desired, an inert gas such as steam may be added through line 30 to annular space 24 to strip volatile distillation products from solids passing into standpipe 26. The spent shale discharges from pipe 26 into line 32 wherein it is picked up by an oxidizing gas such as air to form a dilute suspension which is forced under the pseudo-hydrostatic pressure of standpipe 26 into the lower portion of heater 40. At least a part of the air may be preheated to a temperature of about 300° to 700° F., as will appear hereinafter. The amount of air admitted through line 32 should be sufficient to burn enough shale coke within heater 40 to heat the solids therein to a temperature of about 1100° to 1850° F. About 175 to 1700 lbs. of preheated air per ton of shale is usually sufficient for this purpose. The air and spent shale enter heater 40 through a distributing device such as grid 36. The superficial gas velocity within heater 40 is so controlled that the solids form above grid 36 a dense, turbulent, fluidized bed $M_{40}$ having a well defined upper level $L_{40}$. Gas velocities of about 0.3–1.5 ft. per second are generally adequate to fluidize the relatively fine charge of heater 40. Hot gases from kiln 70 may be passed through line 88 to exchanger tubes 90 located in the fluidized bed of vessel 40. The excellent heat transfer characteristics obtained in the fluid bed require only a nominal tube surface area. The hot gases may pass to waste heat exchanger 92 and may be exhausted by blower 94. The top pressure of heater 40 is preferably maintained at about 0.5–10 lbs. per sq. in. gauge. Heat exchange tubes similar to tubes 90 may be arranged in retort 10 to permit heat exchange between distilling shale and hot flue gases from kiln 70.

Simultaneously, limestone crushed to an average particle size of about 30–60 microns may be supplied from hopper 42 through pipe 44 to heater 40 in the proper amounts, to form with the shale particles of similar size, a mixture having the proportions of CaO, $SiO_2$, $Al_2O_3$ and $Fe_3O_4$ desired for the subsequent cement manufacturing stage. Up to 250 lbs. of ground limestone per 100 lbs. of spent shale supplied to heater 40 may be employed. The ground limestone may also be supplied wholly or in part through lines 44, 46 and 12 to retort 10 from which it will return through lines 26 and 32 to heater 40 and/or join the shale fines in line 20.

At the flow conditions and particle size distribution prevailing in heater 40, a large proportion of the solids, amounting to about 25 to 70% will be carried overhead from level $L_{40}$ by the flue gas to enter separation system 48 which may operate in a manner similar to that outlined in connection with system 16. Particles of more than about 100 microns size are returned to bed $M_{40}$ through line 50 and smaller particles are withdrawn through line 52 to be further treated as will appear hereinafter. Flue gases, which still may contain small proportions of finest solids particles are withdrawn through line 54, passed through a waste heat recovery element 56, and then, if desired, after further fines separation in precipitator 58, to any desired use such as fluidization, preheating, etc., as indicated above. Fines separated in precipitator 58 may be passed through line 60 to cement kiln 70. It will be understood that separation systems 48 and 58 may cooperate in any desired manner to recover the proper amount of solids of adequate size distribution as required for the charge of kiln 70.

A substantial proportion of the solids in bed $M_{40}$ is withdrawn through bottom drawoff pipe 62 and returned to retort 10 through line 12, essentially at the temperature of heater 40. Another portion of the solids of bed $M_{40}$ is withdrawn through bottom drawoff line 64 and subjected to elutriation in separator 66 to obtain a fraction of smaller than about 100 microns which is passed on through line 67 together with the fines from line 20 to kiln 70, and a fraction coarser than about 100 microns which is returned to retort 10 through lines 69, 62 and 12.

It will be appreciated from the foregoing that by far the major proportion of the solids charge to kiln 70 is supplied through line 67 at a temperature closely approximating that of heater 40. In addition, a substantial amount of fuel has been made available in the form of shale coke. As a result, the amount of extraneous fuel required to maintain the desired burning and sintering temperature in kiln 70 as well as the size of the kiln may be substantially reduced which leads to considerable savings in investment and operating cost.

The amount of extraneous fuel required may be supplied through line 72, preferably in the form of a fuel gas recovered from retort 10, admixed with preheated air fed from lines 74 and 75 and passed to kiln 70 countercurrently to the solids charge. About 4,000 to 5,000 standard cu. ft. of a 1,000 B. t. u. ft. fuel gas per ton of material charged is generally sufficient to maintain a sintering temperature of about 2500° F. in kiln 70. Sintered cement clinker is withdrawn from the lower end of kiln 70 through line 76 and may be used in heat exchanger 78 to preheat the incoming air to about 300° to 700° F. Cooled cement clinker is passed through line 80 to storage or regrinding equipment (not shown). Heat exchanger 78 may also serve to preheat the air required in heater 40. In this case, the necessary amount of air may be branched off line 75 and passed through line 82 to line 32 and heater 40.

The cement clinker produced in kiln 70 at the conditions specified above will have about the following average composition:

| | Weight percent |
|---|---|
| SiO₂ | 20–25 |
| Al₂O₃ | 4–11 |
| CaO | 50–65 |
| SO₃ | 1–3 |
| Na₂O | 1–3 |
| Other | 0–3 |

This composition complies with all requirements of a high grade Portland cement.

The system illustrated by Figure 1 permits of various modifications. Standpipes 5, 26, 46, 62, 64, etc. may be replaced by other conventional means for conveying finely divided solids, such as lockhoppers, mechanical conveyors, etc. Instead of feeding solids through lines 5 and 44 directly to vessels 10 and 40, respectively, the solids may be suspended in the gases flowing through pipes 12 and 32, respectively, and fed to the bottom portions of these vessels. It will also be understood that the limestone from hopper 42 may be supplied in part or as a whole directly to kiln 70, if desired after a suitable heat exchange with flue gases from heater 40 or kiln 70. Anyone or two of the solids feed lines 20, 60 and 67 to kiln 70 may be partially or completely eliminated. Excess coarse spent shale particles unsuitable for cement manufacture, which may be resistant to further attrition may be withdrawn from the system through line 96 or by any other suitable means. Other modifications will appear to those skilled in the art without deviating from the spirit of the invention.

An embodiment of the invention involving different ways of separating spent shale fines from coarse material is illustrated in a simplified manner by Figure 2.

Referring now in detail to Figure 2, coarse fresh shale may be supplied from hopper 201 through line 205 to retort 210 wherein it is heated and fluidized substantially as described in connection with Figure 1. Shale fines carried overhead from level L₂₁₀ by the distillation products and the fluidizing gas supplied through line 212 are separated in separating system 216 and returned to mass M₂₁₀ through pipe 218. Distillation products substantially free of entrained fines are recovered through line 222.

Spent shale of all particle sizes is withdrawn from mass M₂₁₀ through line 226 and passed to a solids fractionating system such as elutriator 229 supplied with a suitable gas through line 227 wherein the spent shale is separated into a fraction having a particle size suitable for cement manufacture, say, of less than about 100 microns or less and a coarser fraction of above 100 micron particle size. The latter fraction is withdrawn through line 231 and passed to heater 240 wherein it is fluidized and burned by air supplied through line 232 substantially as outlined above in connection with heater 40. The temperature in heater 240 may be about 1100°–1300° F. Highly heated spent shale is returned to retort 210 through line 262 substantially at the temperature of heater 240 and in amounts sufficient to supply the heat required in retort 210.

The fines fraction separated in system 229 is withdrawn overhead through line 233 and may be passed to a burner 235 to which air may be supplied through line 237 at a rate sufficient to fluidize and heat by combustion the solids in heater 235 to a temperature of about 1200°–1800° F. A gas solids separation system 239 prevents solids fines from escaping with the flue gases from heater 235. Finely ground limestone may be supplied from hopper 242 through line 244 to heater 235 which thus serves simultaneously as mixing and preheating zones for the cement mixture. About 150–250 lbs. of limestone are required per 100 lbs. of spent shale supplied to heater 235. The well mixed and preheated solids fines are withdrawn from heater 235 through line 267 and passed directly to kiln 270 which may be operated as outlined in connection with kiln 70. If desired, all or part of the limestone may by-pass heater 235 and enter kiln 270 directly through line 247. Heater 235 may also be omitted and both spent shale fines and limestone be fed directly to kiln 270.

The results and advantages obtainable in a system of the type illustrated by Figure 2 are substantially the same as those set forth in connection with Figure 1. Similar modifications as those discussed in connection with Figure 1 may be applied to Figure 2.

While the foregoing description and exemplary operations have served to illustrate specific applications and results of the invention, other modifications obvious to those skilled in the art are within the scope of our invention. Only such limitations should be imposed on the invention as are indicated in the appended claims.

We claim:

1. The method of manufacturing cement from oil shale containing silica, alumina and iron oxide in proportions suitable for cement manufacture, which comprises subjecting coarsely crushed fresh oil shale in the form of a dense turbulent mass of subdivided solids fluidized by an upwardly flowing gas to distillation at a distillation temperature in a distillation zone, withdrawing volatile distillation products from said distillation zone, withdrawing spent carbonaceous shale residue from said distillation zone, circulating said residue to a heating zone, maintaining said residue in said heating zone in the form of a dense turbulent mass fluidized by an upwardly flowing gas, subjecting a portion of the carbonaceous constituents of said residue to combustion in said heating zone to heat the solids therein to a temperature between about 1100° and 1800° F. but higher than said distillation temperature, circulating solids from said heating zone to said distillation zone substantially at said higher temperature to supply heat to said distillation zone and to close a cycle of solids circulation, maintaining said shale in said cycle for a time sufficient to form substantial proportions of shale fines having a particle size suitable for cement manufacture, mixing said fines highly heated by said combustion with finely divided limestone by adding the latter to said heating zone in amounts and having a particle size suitable for cement manufacture, separating a mixture of fines and limestone from coarser particles circulating in said cycle, passing said mixture substantially at said higher temperature to a cement making zone, and subjecting said mixture to a burning and sintering treatment in said cement-making zone at cement-making conditions.

2. The process of claim 1 in which said limestone is added to said cycle and separated together with said fines from coarser particles.

3. The process of claim 2 in which said heating zone is operated at about 1200°–1800° F., a substantial proportion of said separation is applied to solids withdrawn from said heating zone and said separated mixed fines and limestone are supplied to said cement-making zone substantially at said last mentioned temperature.

4. The process of claim 1 in which said fines and limestone have an average particle size of less than 100 microns.

5. The process of claim 4 in which said average particle size is less than about 50 microns.

6. The process of claim 1 in which said coarsely crushed fresh shale has an average particle size substantially larger than that required for cement manufacture.

7. The process of claim 6 in which said coarsely crushed fresh shale has a particle size of 50 mesh to ¾ inch diameter.

8. The method of manufacturing cement from oil shale containing silica, alumina and iron oxide in proportions suitable for cement manufacture, which comprises subjecting coarsely crushed fresh oil shale in the form of a dense turbulent mass of subdivided solids fluidized by an upwardly flowing gas to distillation at a distillation temperature in a distillation zone, withdrawing spent carbonaceous shale residue from said distillation zone, circulating said residue to a heating zone, maintaining said residue in said heating zone in the form of a dense turbulent mass fluidized by an upwardly flowing gas, subjecting a portion of the carbonaceous constituents of said residue to combustion in said heating zone to heat the solids therein to a temperature between about 1100° and 1800° F. but higher than said distillation temperature, circulating solids from said heating zone to said distillation zone substantially at said higher temperature to supply heat to said distillation zone and to close a cycle of solids circulation, maintaining said shale in said cycle for a time sufficient to form substantial proportions of shale fines having a particle size suitable for cement manufacture, mixing said fines highly heated by said combustion with finely divided limestone by adding the latter to said heating zone in amounts and having a particle size suitable for cement manufacture, separating by differences in gas buoyancy a mixture of fines and limestone from coarser particles circulating in said cycle, passing said mixture substantially at said higher temperature to a cement making zone, and subjecting said mixture to a burning and sintering treatment in said cement making zone at cement making conditions.

9. The process of claim 8 in which said separation takes place at least partly in said distillation zone.

10. The process of claim 8 in which said separation takes place at least partly in said heating zone.

11. The process of claim 8 in which said separation takes place on the path of the solids between said distillation and heating zones.

12. The process of claim 11 in which said heating zone comprises two separate sections, said separated fines are subjected to combustion and said limestone is mixed and heated with said fines in one of said sections at a temperature of about 1200°–1800° F., the mixture so formed is passed substantially at said section temperature to said cement-making zone, separated coarse material is heated in another one of said sections to about 1100°–1300° F., and coarse material so heated is returned to said distillation zone substantially at said last-mentioned temperature.

13. The method of manufacturing cement from oil shale containing silica, alumina and iron oxide in proportions suitable for cement manufacture, which comprises subjecting coarsely crushed fresh oil shale in the form of a dense turbulent mass of subdivided solids fluidized by an upwardly flowing gas to distillation at a distillation temperature in a distillation zone, withdrawing volatile distillation products from said distillation zone, withdrawing spent carbonaceous shale residue from said distillation zone, circulating said residue to a heating zone, maintaining said residue in said heating zone in the form of a dense turbulent mass fluidized by an upwardly flowing gas, subjecting a portion of the carbonaceous constituents of said residue to combustion in said heating zone to heat the solids therein to a temperature between about 1100° and 1800° F. but higher than said distillation temperature, circulating solids from said heating zone to said distillation zone substantially at said higher temperature to supply heat to said distillation zone and to close a cycle of solids circulation, adding finely divided limestone to the cycle in amounts and having a particle size suitable for cement manufacture, maintaining said shale in said cycle for a time sufficient to form substantial proportions of shale fines having a particle size suitable for cement manufacture, separating a mixture of fines and limestone from coarser particles circulating in said cycle, passing said mixture substantially at said higher temperature to a cement making zone, and subjecting said mixture to a burning and sintering treatment in said cement making zone at cement making conditions.

WALTER A. REX.
CHESTER L. READ.

REFERENCES CITED

The following references are of record in the file of this patent:

UNITED STATES PATENTS

| Number | Name | Date |
|---|---|---|
| 1,323,294 | Lesley | Dec. 2, 1919 |
| 1,366,479 | Newberry | Jan. 25, 1921 |
| 1,983,943 | Odell | Dec. 11, 1934 |
| 2,409,707 | Roetheli | Oct. 22, 1946 |

FOREIGN PATENTS

| Number | Country | Date |
|---|---|---|
| 578,711 | Great Britain | 1946 |
| 586,391 | Great Britain | 1947 |